Jan. 27, 1948.  L. W. WIGHTMAN  2,435,112
COUPLING
Filed Feb. 11, 1946
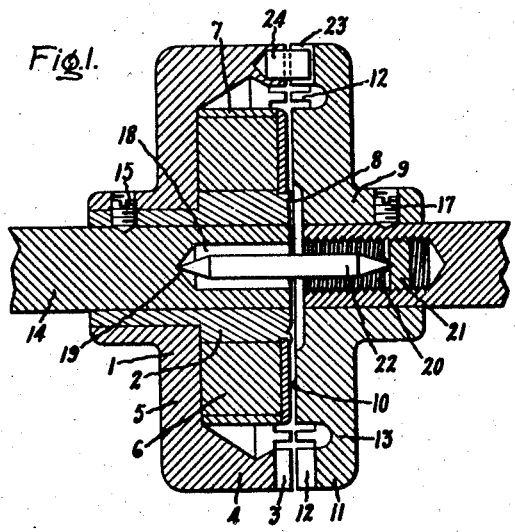
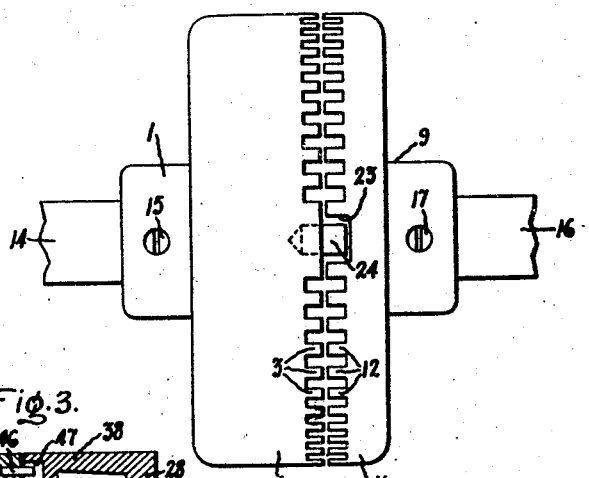
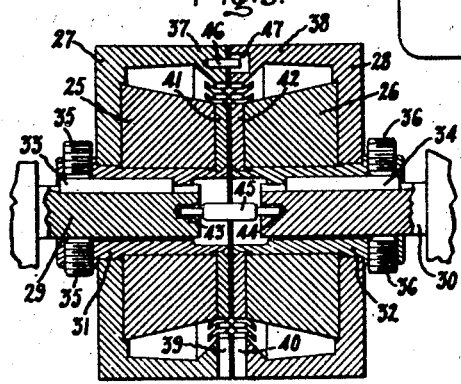
Inventor:
Lawrance W. Wightman,
by Powell S. Mack
His Attorney.

Patented Jan. 27, 1948

2,435,112

UNITED STATES PATENT OFFICE 2,435,112

COUPLING

Lawrance W. Wightman, Fort Wayne, Ind., assignor to General Electric Company, a corporation of New York Application February 11, 1946, Serial No. 646,865

15 Claims. (Cl. 172—284)

1

My invention relates to couplings and particularly to magnetic couplings which are adapted to transmit torque therethrough by the magnetic drag effects of one coupling member on the other without mechanical frictional contact.

An object of my invention is to provide improved couplings.

Another object of my invention is to provide improved magnetic couplings without the use of frictional clutching surfaces.

A further object of my invention is to provide improved magnetic couplings with an arrangement for a direct mechanical connection under high torque conditions.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a sectional side elevational view of an embodiment of my improved coupling construction; Fig. 2 is a plan view of the coupling shown in Fig. 1; and Fig. 3 is a sectional side elevational view of another embodiment of my invention.

Referring to the drawing, I have shown an embodiment of my improved coupling construction provided with a coupling member 1 of magnetic material having a central longitudinally extending hub or bushing portion 2 of nonmagnetic material and provided with a plurality of circumferentially spaced teeth 3 on an outer radial face of a radially spaced ring portion 4 which surrounds and is mounted on the central hub portion 2 by an integral outwardly extending web portion 5. A substantially toroidal magnet 6 is mounted in the coupling member 1 on the hub portion 2 and may be of any suitable construction, such as a permanent magnet having poles of opposite polarity at the two axial longitudinally spaced ends thereof. With a permanent magnet 6 arranged to excite the coupling members magnetically, I provide a casing 7 having a nonmagnetic material substantially cylindrical side portion and an end of magnetic material forming a cup arranged around the permanent magnet 6 and secured in position in any suitable manner, as by brazing, welding, or by being staked in position as shown at 8. A second coupling member 9 of magnetic material is formed with a central annular polar portion 10 and an outer ring portion 11 formed with a plurality of circumferentially spaced teeth 12 in the radial face of

2 the portion 11 and is radially spaced and secured to the hub portion 10 by an integral web portion 13. With the permanent magnet excitation of the coupling members described above, the teeth 3 will be polarized at one magnetic polarity and the teeth 12 will be polarized at the opposite magnetic polarity, the magnetic circuit being from the magnet 6 to the central annular polar portion 10 of coupling member 9, web portion 13, radial face 11, teeth 12, teeth 3, ring portion 4 of coupling member 1, and web portion 5 back to the permanent magnet 6. The teeth 12 are made substantially the same in number and size as the teeth 3 of the coupling member 1, so that for a given position, the magnetic poles formed by the teeth 3 and 12 of the coupling members will be substantially in axial alignment to provide for the lowest reluctance in the magnetic circuit and a maximum torque transmitting position when the teeth of one coupling member are displaced substantially midway between the teeth of the other coupling member.

In this coupling construction, torque is adapted to be transmitted from one coupling member to the other without the use of frictional engagement surfaces, and, therefore, it is necessary that the adjacent surfaces of the two coupling members 1 and 9 be held in axially spaced relationship. This is obtained by providing a bearing in the central part of both of the coupling members and arranging a thrust pin for maintaining the members in spaced relation. In the illustrated construction, the coupling member 1 is mounted on and supported by a shaft 14 to which it is secured in any suitable manner, as by a setscrew 15, and the coupling member 9 is mounted on and supported by a shaft 16, to which it is secured in any suitable manner, as by a setscrew 17. The shaft 14 is formed with a central bearing opening or socket 18 having a bearing portion 19, and the shaft 16 is formed with a central bearing opening or socket 20 which is internally threaded and in which a central bearing member 21 is secured by threaded engagement with the socket 20. A spacing thrust pin 22 extends into both of the bearing sockets and engages the bearings 19 and 21, so as to maintain the adjacent surfaces of the coupling members 1 and 9 at a predetermined desired axial spacing. This air gap spacing between the two coupling members may be adjusted by adjusting the position of the bearing member 21 within the threaded bearing socket 20 in the shaft 16.

In certain types of couplings of the general character to which this invention relates, it may be found that an abnormally high starting torque is required to be transmitted through the coupling, and the magnetic forces between the two coupling members may not be adequate to provide the transmittal of this high torque, and a positive mechanical connection is required which will be operative only under such conditions. In the illustrated arrangement, a notch or socket 23 is formed in the radial face of the coupling member 9, and a dog 24 of nonmagnetic material is secured in the radial face of the other coupling member 10 and arranged to extend into the notch 23; such that under normal operating conditions, the dog 24 is spaced midway between the sides of the notch 23 out of engagement with these sides, and the notch 23 is formed of such a size relative to the size of the dog 24 to provide for an angular displacement between the teeth 3 and 12 of the two coupling members to permit these teeth to move to a position so that the teeth of one member are substantially midway between the teeth on the other coupling member before one side of the dog 24 engages a side of the notch or socket 23. Under high torque transmission conditions, however, the dog 24 engages a side of the notch 23 and the relative sizes of these two mechanical driving parts of the two coupling members are made such that when a mechanical driving connection is made, the teeth on one of the coupling members is substantially midway between the teeth on the other coupling members, with the teeth on the dog-carrying member 1 having a slightly larger gap from adjacent the teeth 12 on the notched coupling member 9 on the side thereof corresponding to the side of the dog in engagement with a side of the notch 23 than the gap between the teeth 3 on the dog carrying member and adjacent teeth 12 on the notched member on the side of the dog not in engagement with a side of the notch, thereby providing a position of the teeth for a maximum transmission of torque through the magnetic forces between these teeth in addition to a direct mechanical driving engagement between the dog 24 and the side of the notch 23.

In Fig. 3 of the drawing I have shown another embodiment of my invention in which both of the coupling members are provided with exciting magnets 25 and 26 which may be permanent magnets similar to that shown in Fig. 1. These magnets 25 and 26 are mounted in coupling members 27 and 28 of magnetic material which are adapted to be supported on shafts 29 and 30 by nonmagnetic central bushings 31 and 32 secured to the shaft in any suitable manner, as by keys 33 and 34 and setscrews 35 and 36, respectively. These coupling members 27 and 28 are formed similar to the coupling members in Fig. 1 with circumferentially extending ring portions 37 and 38 with circumferentially spaced teeth 39 and 40 in the adjacent radial faces thereof. If desired, the magnets 25 and 26 also may be provided with pole faces 41 and 42 of magnetic material which may be secured in any desired manner to the magnets 25 and 26 and to the nonmagnetic bushing members 31 and 32. In this construction, the two coupling members are adapted to be axially spaced with an air gap between the adjacent poles thereof by providing a central bearing in the central part of both of the members to be coupled together. This spacing may be obtained by a construction similar to that shown in Fig. 1 or by simpler arrangement, such as that shown in this figure, in which the shafts 29 and 30 are formed with bearing sockets 43 and 44 with a thrust pin 45 seated in these two bearing sockets 43 and 44 and made of such a length as to provide the desired air gap between the adjacent pole faces of the two coupling members. Furthermore, as in the arrangement shown in Fig. 1 it may be desired for certain types of couplings to provide a positive mechanical drive between the two coupling members under abnormally high torque conditions, and this is provided by permitting a relative circumferential displacement of the teeth 39 and 40 of the two coupling members so that they become substantially opposite the slots between the teeth for a maximum transmission of torque by the magnetic forces between these teeth, and a dog 46 is secured in the radial face of one of the coupling members and extends into a socket 47 in the radial face of the other coupling member. As in the arrangement shown in Fig. 1, the relative sizes of the dog 46 and the slot or notch 47 are such as to permit the above-mentioned maximum circumferential displacement between the teeth of the two members before the dog 46 contacts a side of the socket or notch 47, thereby providing for the maximum transmission of torque by the magnetic forces between the teeth in addition to a direct mechanical driving engagement between the dog 46 and the side of the socket 47. In some installations, it may be found desirable to provide a plurality of these direct mechanical driving dog and socket arrangements and these may be spaced circumferentially around the periphery of the two coupling members. In either of the two constructions shown, the direct mechanical driving arrangement may be omitted so that the maximum torque which can be transmitted through the coupling will definitely be limited by the slippage between the two coupling members dependent on the maximum magnetic forces which can be exerted between the teeth of the two coupling members when these teeth are displaced substantially midway between each other.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A coupling including a member of magnetic material with a central portion having a plurality of circumferentially spaced teeth on the outer radial face of a radially spaced ring portion connected to said central portion by an integral outwardly extending web portion, a second coupling member of magnetic material with a central portion and an outer ring portion with circumferentially spaced teeth on the radial face thereof substantially the same in number and size as said first-mentioned coupling member teeth spaced radially from said central portion and connected thereto by an integral web portion, a magnet mounted on said first named coupling member and polarized axially whereby the teeth of said first named coupling member are polarized at a polarity opposite from the teeth of said second named coupling member, and nonmagnetic axial thrust means for maintaining said coupling members in predetermined axially spaced relation.

2. A coupling including a member of magnetic material with a central portion having a plurality of circumferentially spaced teeth radially spaced from and connected to said central portion by an integral outwardly extending portion, a second coupling member of magnetic material axially spaced from said first-mentioned coupling member with a central portion and a plurality of circumferentially spaced apart teeth substantially the same in number and size and said first-mentioned coupling member teeth spaced radially from said central portion and connected thereto by an integral portion, a magnet mounted in said first named coupling member between said central and teeth portions and polarized axially whereby the teeth of said first named coupling member are polarized at a polarity opposite from the teeth of said second named coupling member, and axial thrust means for maintaining said coupling members in predetermined axially spaced relation.

3. A coupling including a member of magnetic material with a central portion having a plurality of circumferentially spaced teeth on the outer radial face of a radially spaced ring portion connected to said central portion by an integral outwardly extending web portion, a second coupling member of magnetic material with a central portion and an outer ring portion with circumferentially spaced teeth on the radial face thereof substantially the same in number and size as said first-mentioned coupling member teeth spaced radially from said central portion and connected thereto by an integral web portion, a magnet mounted on said first named coupling member and polarized axially whereby the teeth of said first named coupling member are polarized at a polarity opposite from the teeth of said second named coupling member, a central bearing in said first-mentioned coupling member, a central bearing in said second coupling member, and means including a thrust pin engaging both of said bearings for maintaining said coupling members at a predetermined axial spacing.

4. A coupling including a member of magnetic material with a central portion having a plurality of circumferentially spaced teeth on the outer radial face of a radially spaced surrounding ring portion connected to said central portion by an integral outwardly extending web portion, a second coupling member of magnetic material axially spaced from said first-mentioned coupling member with a central portion and an outer ring portion with circumferentially spaced teeth on the radial face thereof substantially the same in number and size as said first-mentioned coupling member teeth spaced radially from said central portion and connected thereto by an integral web portion, a magnet mounted on said first named coupling member and polarized axially whereby the teeth of said first named coupling member are polarized at a polarity opposite from the teeth of said second named coupling member, and axial thrust means for maintaining said coupling members in predetermined axially spaced relation.

5. A coupling including a member of magnetic material with a central portion having a plurality of circumferentially spaced teeth on the outer radial face of a radially spaced ring portion connected to said central portion by an integral outwardly extending web portion, a magnet on said coupling member, a second coupling member of magnetic material with a central portion and an outer ring portion with circumferentially spaced teeth on the radial face thereof substantially the same in number and size as said first-mentioned coupling member teeth spaced radially from said central portion and connected thereto by an integral web portion, means for supporting said first-mentioned coupling member including a member having a central bearing opening therein, means for supporting said second coupling member including a second supporting member having a central bearing opening therein, and means including a thrust pin extending into both of said bearing openings and engaging bearing surfaces therein for maintaining said coupling members at a predetermined axial spacing.

6. A coupling including a member of magnetic material with a central portion having a plurality of circumferentially spaced teeth radially spaced and connected to said central portion by an integral portion, a second coupling member of magnetic material with a central portion and a plurality of circumferentially spaced teeth connected to said central portion by an integral portion, a magnet mounted on said first named coupling member and polarized axially whereby the teeth of said first named coupling member are polarized at a polarity opposite from the teeth of said second named coupling member, axial thrust-resisting means for maintaining said coupling members in predetermined axially spaced relation, a notch in one of said coupling members, and a dog of nonmagnetic material in the other of said coupling members extending into said notch and being of a size relative to said notch to provide for mechanical engagement of said dog with a side of said notch substantially only under high torque transmission conditions with a relative positioning of said teeth on one of said coupling members substantially midway between the teeth on the other of said coupling members.

7. A coupling including a member of magnetic material with a central portion having a plurality of circumferentially spaced teeth on the outer radial face of a radially spaced surrounding central portion by an integral outwardly extending web portion, a substantially toroidal magnet mounted in said coupling member between said central hub and ring portions, a second coupling member of magnetic material axially spaced from said first-mentioned coupling member with a central portion and an outer ring portion with circumferentially spaced teeth on the radial face thereof substantially the same in number and size as said first-mentioned coupling member teeth spaced radially from said central portion and connected thereto by an integral web portion, means for supporting said first-mentioned coupling member including a member having a central bearing opening therein, means for supporting said second coupling member including a second supporting member having a central bearing opening therein, and means including a thrust pin extending into both of said bearing openings and engaging bearing surfaces therein for maintaining said coupling members at a predetermined axial spacing.

8. A coupling including a member of magnetic material with a central portion having a plurality of circumferentially spaced teeth radially spaced and connected to said central portion by an integral portion, a second coupling member of magnetic material with a central portion and circumferentially spaced teeth thereon substantially the same in number as said first-mentioned coupling member teeth and connected to said central portion by an integral portion, a magnet mounted on said first named coupling member and polarized axially whereby the teeth of said first named coupling member are polarized at a polarity opposite from the teeth of said second named coupling member, axial thrust means for maintaining said coupling members at a predetermined axial spacing, a notch in one of said coupling members, and a dog of nonmagnetic material in the other of said coupling members extending into said notch and being of a size relative to said notch to provide for mechanical engagement of said dog with a side of said notch substantially only under high torque transmission conditions with a relative positioning of said teeth on one of said coupling members substantially midway between the teeth on the other of said coupling members for maximum torque transmission between said coupling members by a direct mechanical drive therebetween through said dog and by magnetic forces between said teeth.

9. A coupling including a member of magnetic material with a central portion having a plurality of circumferentially spaced teeth radially spaced and connected to said central portion by an integral outwardly extending portion, a second coupling member of magnetic material with a central portion and circumferentially spaced teeth thereon substantially the same in number as said first-mentioned coupling member teeth and connected to said central portion by an integral portion, a magnet mounted on said first named coupling member and polarized axially whereby the teeth of said first named coupling member are polarized at a polarity opposite from the teeth of said second named coupling member, a central bearing in said first-mentioned coupling member, a central bearing in said second coupling member, axial thrust means engaging both of said bearings for maintaining said coupling members at a predetermined axial spacing, a notch in one of said coupling members, and a dog of nonmagnetic material in the other of said coupling members extending into said notch and being of a size relative to said notch to provide for mechanical engagement of said dog with a side of said notch substantially only under high torque transmission conditions with a relative positioning of said teeth on one of said coupling members substantially midway between the teeth on the other of said coupling members for maximum torque transmission between said coupling members by a direct mechanical drive therebetween through said dog and by magnetic forces between said teeth.

10. A coupling including a member of magnetic material with a central portion having a plurality of circumferentially spaced teeth on a radially spaced portion connected to said central portion by an integral outwardly extending web portion, a second coupling member of magnetic material with a central portion and an outer portion with circumferentially spaced teeth thereon substantially the same in number as said first-mentioned coupling member teeth and connected thereto by an integral web portion, a magnet mounted on said first named coupling member and polarized axially whereby the teeth of said first named coupling member are polarized at a polarity opposite from the teeth of said second named coupling member, a central bearing in said first-mentioned coupling member, a central bearing in said second coupling member, means engaging both of said bearings for maintaining said coupling members at a predetermined axial spacing, a notch in one of said coupling members, and a dog of nonmagnetic material in the other of said coupling members extending into said notch and being of a size relative to said notch to provide for mechanical engagement of said dog with a side of said notch under high torque transmission conditions with a relative positioning of said teeth on one of said coupling members substantially midway between the teeth on the other of said coupling members for maximum torque transmission between said coupling members by a direct mechanical drive therebetween through said dog and by magnetic forces between said teeth.

11. A coupling including a member of magnetic material with a central portion having a plurality of circumferentially spaced teeth on the outer radial face of a radially spaced surrounding ring portion connected to said central portion by an integral outwardly extending web portion, a substantially toroidal magnet mounted in said coupling member between said central and ring portions, a second coupling member of magnetic material axially spaced from said first-mentioned coupling member with a central portion and an outer ring portion with circumferentially spaced teeth on the radial face thereof substantially the same in number and size as said first-mentioned coupling member teeth spaced radially from said central portion and connected thereto by an integral web portion, means for supporting said first-mentioned coupling member including a member having a central bearing opening therein, means for supporting said second coupling member including a second supporting member having a threaded central bearing opening therein, an adjustable central bearing threadedly secured in said threaded central bearing opening of said second coupling supporting member for adjusting the spacing between the bearings in said supporting members, and means including a thrust pin extending into both of said bearing openings and engaging bearing surfaces therein for maintaining said coupling members at a predetermined axial spacing.

12. A coupling including a member of magnetic material with a central portion having a plurality of circumferentially spaced teeth on the outer radial face of a radially spaced ring portion connected to said central portion by an integral outwardly extending web portion, a magnet on said coupling member, a second coupling member of magnetic material with a central portion and an outer ring portion with circumferentially spaced teeth on the radial face thereof substantially the same in number and size as said first-mentioned coupling member teeth and connected thereto by an integral web portion, a central bearing in said first-mentioned coupling member, a central bearing in said second coupling member, means including a thrust pin engaging both of said bearings for maintaining said coupling members at a predetermined axial spacing, a notch in one of said coupling members, and a dog of nonmagnetic material in the other of said coupling members extending into said notch and being of a size relative to said notch to provide for mechanical engagement of said dog with a side of said notch under high torque transmission conditions with a relative positioning of said teeth on one of said coupling members substantially midway between the teeth on the other of said coupling members for maximum torque transmission between said coupling members by a direct mechanical drive therebetween through said dog and by magnetic forces between said teeth.

13. A coupling including a member of magnetic material with a central portion having a plurality of circumferentially spaced teeth on the outer radial face of a radially spaced ring portion connected to said central portion by an integral outwardly extending web portion, a magnet on said coupling member between said central and ring portions, a second coupling member of magnetic material with a central portion and an outer ring portion with circumferentially spaced teeth on the radial face thereof substantially the same in number and size as said first-mentioned coupling member teeth spaced radially from said central portion and connected thereto by an integral web portion, a central bearing in said first-mentioned coupling member, a central bearing in said second coupling member, means engaging both of said bearings for maintaining said coupling members at a predetermined axial spacing, a notch in one of said coupling members, and a dog in the other of said coupling members extending into said notch and being of a size relative to said notch to provide for mechanical engagement of said dog with a side of said notch under high torque transmission conditions with a relative positioning of said teeth on one of said coupling members substantially midway between the teeth on the other of said coupling members with the teeth of said dog-carrying member having a slightly larger gap from adjacent teeth on said notched member on the side thereof corresponding to the side of said dog in engagement with a side of said notch than the gap between the teeth of said dog-carrying member and adjacent teeth of said notched member on the side of said dog not in engagement with a side of said notch providing for maximum torque transmission between said coupling members by a direct mechanical drive therebetween through said dog and by magnetic forces between said teeth.

14. A coupling including a member of magnetic material with a central portion having a plurality of circumferentially spaced teeth on the outer radial face of a radially spaced ring portion connected to said central portion by an integral outwardly extending web portion, a magnet on said coupling member between said central and ring portions, a second coupling member of magnetic material with a central portion and an outer ring portion with circumferentially spaced teeth on the radial face thereof substantially the same in number and size as said first-mentioned coupling member teeth spaced radially from said central portion and connected thereto by an integral web portion, means for supporting said first-mentioned coupling member including a member having a central bearing, means for supporting said second coupling member including a second supporting member having a central bearing, means engaging both of said bearings for maintaining said coupling members at a predetermined axial spacing, a notch in the radial face of one of said coupling members, and a dog in the other of said coupling members extending into said notch and being of a size relative to said notch to provide for mechanical engagement of said dog with the sides of said notch under high torque transmission conditions with a relative positioning of said teeth on one of said coupling members substantially midway between the teeth on the other of said coupling members with the teeth of said dog-carrying member having a slightly larger gap from adjacent teeth on said notched member on the side thereof corresponding to the side of said dog in engagement with a side of said notch than the gap between the teeth of said dog-carrying member and adjacent teeth of said notched member on the side of said dog not in engagement with a side of said notch providing for maximum torque transmission between said coupling members by a direct mechanical drive therebetween through said dog and by magnetic forces between said teeth.

15. A coupling including a member of magnetic material with a central hub portion having a plurality of circumferentially spaced apart teeth on the outer radial face of a surrounding ring portion connected to said hub by an integral outwardly extending web portion, a substantially toroidal magnet mounted in said coupling member between said hub and ring portions, a second coupling member of magnetic material axially spaced from said first-mentioned coupling member with a central portion and an outer ring portion with circumferentially spaced apart teeth on the radial face thereof substantially the same in number and size as said first-mentioned coupling member teeth spaced radially from said central portion and connected thereto by an integral web portion, means for supporting said first-mentioned coupling member including a member having a central bearing opening therein, means for supporting said second coupling member including a second supporting member having a threaded central bearing opening therein, an adjustable central bearing threadedly secured in said threaded central bearing opening of said second coupling supporting member for adjusting the spacing between the bearings in said supporting members, means including a thrust pin extending into both of said bearing openings and engaging bearing surfaces therein for maintaining said coupling members at a predetermined axial spacing, a notch in the radial face of one of said coupling members, and a dog of nonmagnetic material in the other of said coupling members extending into said notch and having a space between the sides of said dog and sides of said notch to provide for mechanical engagement of said dog with the sides of said notch under high torque transmission conditions providing a relative positioning of said teeth on one of said coupling members substantially midway between the teeth on the other of said coupling members with the teeth of said dog-carrying member having a slightly larger gap from adjacent teeth on said notched member on the side thereof corresponding to the side of said dog in engagement with a side of said notch than the gap between the teeth of said dog-carrying member and adjacent teeth of said notched member on the side of said dog not in engagement with a side of said notch providing for maximum torque transmission between said coupling members by a direct mechanical drive therebetween through said dog and by magnetic forces between said teeth.

LAWRANCE W. WIGHTMAN.

REFERENCES CITED

The following references are of record in the file of this patent:

UNITED STATES PATENTS

| Number | Name | Date |
| --- | --- | --- |
| 912,504 | Steckel | Feb. 16, 1909 |
| 1,438,361 | Coleman | Dec. 12, 1922 |
| 2,300,778 | Cornwell | Nov. 3, 1942 |

FOREIGN PATENTS

| Number | Country | Date |
| --- | --- | --- |
| 346,417 | Great Britain | Apr. 13, 1931 |